United States Patent [19]

Taylor et al.

[11] 4,044,251
[45] Aug. 23, 1977

[54] ELECTROMAGNETIC RADIATION DETECTOR WITH LARGE AREA SENSING MEDIUM

[75] Inventors: Allen L. Taylor, Woodbury, Minn.; Thomas C. Ensign, Hudson Township, St. Croix County, Wis.

[73] Assignee: Minnesota Mining and Manufacturing Company, St. Paul, Minn.

[21] Appl. No.: 687,543

[22] Filed: May 18, 1976

[51] Int. Cl.² .............................................. G01J 1/00
[52] U.S. Cl. .................................... 250/342; 250/338
[58] Field of Search .............................. 250/338, 342; 73/362 CP; 136/213, 214; 250/353

[56] References Cited

U.S. PATENT DOCUMENTS

| | | | |
|---|---|---|---|
| 2,601,508 | 6/1952 | Fastie | 136/214 |
| 3,398,281 | 8/1968 | Treharne et al. | 136/213 |
| 3,539,803 | 11/1970 | Beerman | 136/213 |
| 3,769,096 | 10/1973 | Ashkin et al. | 136/213 |
| 3,809,920 | 5/1974 | Cohen et al. | 73/362 CP |
| 3,839,640 | 10/1974 | Rossin | 250/353 |
| 3,971,250 | 7/1976 | Taylor | 73/362 CP |

*Primary Examiner*—Harold A. Dixon
*Attorney, Agent, or Firm*—Cruzan Alexander; Donald M. Sell; Walter N. Kirn

[57] ABSTRACT

A sensing device is provided for the detection of electromagnetic radiation through the use of a large area pyroelectric/piezoelectric sensing medium. The detection operation of the sensing device is constructed to ignore spurious detection indications due to bending or compression of the sensing medium. In a preferred embodiment the sensing device is formed from a two housing construction that includes outer and inner housings. The outer housing of the device includes an infrared transmissive window at one end. To substantially physically isolate the two housings from one another, the inner housing of the device is supported inside the outer housing by means of support members protruding through the opposite end of the outer housing. The sensing medium is disposed in one end of the inner housing and is protected by the outer housing from bending or compressive stress. Also, a rigid low thermal conductive material may be adhered to one side of the sensing medium to reduce low frequency mechanical and acoustical vibration of the medium without substantially reducing the sensitivity of the device and thereby gain signal to noise ratio improvement.

7 Claims, 5 Drawing Figures

ELECTROMAGNETIC RADIATION DETECTOR WITH LARGE AREA SENSING MEDIUM

BACKGROUND OF THE INVENTION

1. Field of the Invention

The present invention relates in general to thermal sensing devices that employ pyroelectric materials and more specifically to sensing device constructions that are designed to ignore spurious signals.

2. Description of the Prior Art

All known polymeric materials possessing pyroelectric properties also possess piezoelectric properties. A variety of thermal sensing devices employing such polymer pyroelectric/piezoelectric sensing materials are taught in the art. It is also taught that such sensing devices are highly sensitive to extraneous signals (noise) due to vibration of the sensing material. In at least one prior art publication, a sensing device is described as being constructed to provide a housing in which a pyroelectric polymeric film of small area is disposed to insulate the sensing medium from acoustical vibrations imposed on the pyroelectric film. "Intrusion-Detection Devices and Systems for air Base Security," Stanford Research Institute (1973).

Although the above prior art sensor is an improvement over detectors having sensing mediums exposed to surrounding conditions it still is deficient in that it is sensitive to forces that cause the entire housing to vibrate and it does not provide solid reliable connections between sensing circuitry employed in the detector and the sensing medium. Moreover, such sensor is not designed for utilizing a large area sensing medium such as employed in the present invention and in fact the author of the publication indicates at page 54 that future sensors should be limited to using sensing mediums with an area of only 1 $cm^2$. We have found that sensors employing large area sensing mediums are vulnerable to not only compressional stress, but also to stresses that cause bending of the sensing medium. No known sensor device prior art has recognized or dealt with avoiding both compressive and bending stresses in sensors employing large area sensing mediums.

One prior art U.S. Pat., No. Rossin 3,839,640 discloses an intrusion detection device that includes a small area sensing medium attached by contact cement to a cube of plastic insulating foam in a construction that appears to be designed to prevent bending of the medium. However, the Rossin disclosure clearly points out that the cube is merely used to provide a framework for supporting the medium and in no way indicates that a similar type support could be used for a large sensing medium to prevent noise from being produced through bending of the medium. This is because Rossin was not confronted with the problem with which the present invention is designed to overcome because small area devices do not experience significant noise generation due to bending.

SUMMARY OF THE INVENTION

The present invention provides a means for obtaining improved performance for large area thermal sensing devices that include an outer housing with an infrared transmissive window and an inner housing that is rigidly supported within said outer housing and serves in turn to support a pyroelectric sensing medium therein substantially isolated from the walls of said outer housing in order to prevent transmission of vibrational stresses between the two housings.

The inner housing includes a body portion with at least one open end and a rim shaped lid adapted to slidably fit over such open end so that when the lid portion is disposed thereon, respective flanges of the body portion and lid portion are juxtaposed with one another and serve to clamp the sensing medium therebetween.

The sensing medium is formed of a three layer structure that includes a pyroelectric layer which carries a conductive layer on each of its planar surfaces. The inner housing is preferably formed from a conductive material in order that the body portion thereof serves as an extension of the conductive layer on one side of the sensing medium and the lid portion serves as an extension of the conductive coating on the other side of the sensing medium. In this way, highly reliable contact is made between the sensing medium and the sensing circuit included in the detector.

A rigid low thermal conductive material may be adhered to one side of the sensing medium to provide a substrate layer that reduces low frequency mechanical and acoustical vibration (e.g. bending) of the medium without significantly degrading the response of the sensing medium to electromagnetic signals.

DESCRIPTION OF THE PREFERRED EMBODIMENTS

Figure 1:
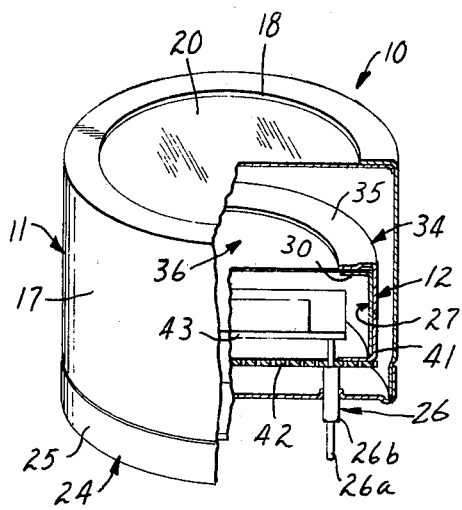
FIG. 1 is a perspective view of the preferred embodiment of the sensing device of the present invention with portions cut away to show interior construction.
Figure 2:
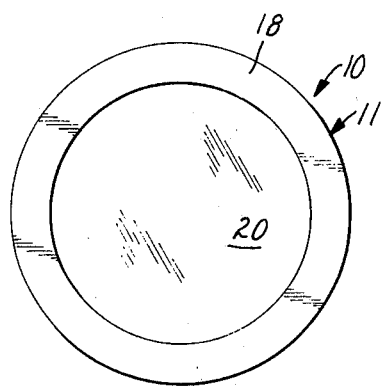
FIG. 2 is a plan view of the sensing device of FIG. 1.
Figure 3:
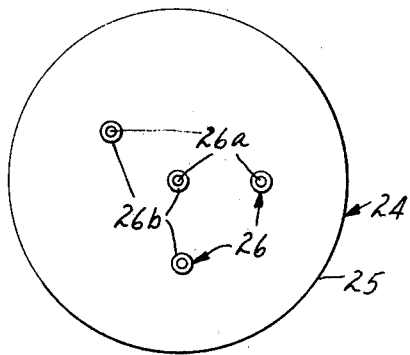
FIG. 3 is a bottom view of the sensing device of FIG. 1.

A thermal sensing device 10 that represents a preferred embodiment of the present invention is shown and described herein and is particularly suited to provide highly accurate sensing of infrared radiation, but it may be equally useful for detecting other types of radiation. Due to the unique construction of the sensing device 10, it is substantially immune from mechanical vibrations and acoustical noise.

As can be seen from FIGS. 1, 2, 3 and 4, the sensing device 10 is cylindrically shaped and is designed in a compact fashion. Referring now to only FIGS. 1 and 4, the device 10 is formed of a double housing construction including preferably a hermetically sealed outer housing 11 that serves as a container for an inner housing 12.

The outer housing 11 includes a body portion 17 that is preferably cylindrically shaped and is open at both top and bottom ends 18 and 19 respectively. a radiation transmissive pane 20, that may or may not be rigid, is sealed across the open end 18 to serve as a window for permitting transmission of radiant waves into the housing 11. The bottom end 19 of the housing 11 is closed off by a circularly shaped base 24 having a flange 25 that overlaps a portion of the body portion 17.

Four support members 26 are disposed through the base 24 to engage and support the inner housing 12 in a fixed position within the outer housing 11 such that the sidewalls of the housing 11 and 12 are not in direct physical contact with one another. In this way, the inner housing 12 is substantially isolated from mechanical viration of the outer housing 11. The support members 26 are each preferably formed with an inner conductive portion 26a and an insulating outer portion 26b that electrically isolates the conductive portions 26a from the base 24.

Figure 4:
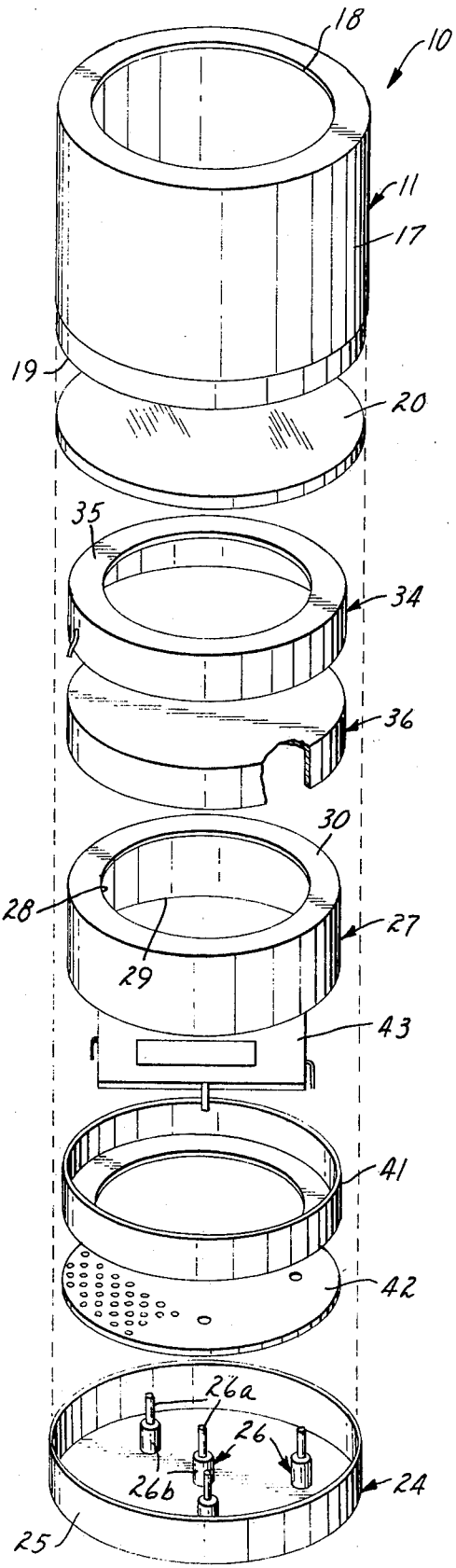
FIG. 4 is an exploded perspective view of the sensing device of FIG. 1.

As best shown in FIG. 4, the inner housing 12 resembles the outer housing 11 in construction as it also includes a cylindrical body portion 27 having open ends 28 and 29. An inner flange 30 is formed at the open end 28 and has a periphery that defines the opening of the end 28. A first rim type lid 34 is adapted to fit over the body portion end 28. The lid 34 is substantially the same shape as the end 28 but is slightly larger to permit the lid 34 to be slidably positioned thereon. The lid 34 includes an inner flange 35 that is juxtaposed with the flange 30 of the body portion 27 when the lid 34 is disposed thereon.

Figure 5:
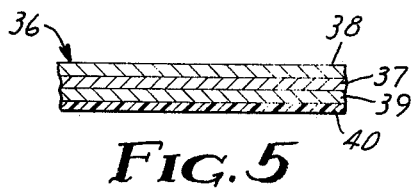
FIG. 5 is an enlarged fragmentary cross sectional view of a sensing medium employed in the sensing device of FIG. 1.

Clamped between the body portion 27 and the lid 34 is a thin, sensing medium 36 that is formed of a pyroelectric layer 37 preferably larger than one cm$^2$ and coated on its front and back surfaces with conductive layers 38 and 39 respectively, as shown in FIG. 5. Forming the layer 37 is a poled insulative material such as polyvinylidene fluoride or other such polymeric material having pyroelectric properties.

Poled, pyroeletric materials exhibit the unique characteristic of developing electrostatic charges on their planar surfaces when subjected to a viriation in temperature, with the charges developed on one surface opposite in polarity to those developed on the other surface.

The conductive layers 38 and 39 serve as electrodes for collecting electrostatic charges developed on the surfaces of the pyroelectric layer 37 in response to temperature variation thereof. Preferably the front surface of the conductive layer 38 is coated with a thin layer of radiation absorbent material such as lamp black (not shown). The housing 12 is preferably formed from a conductive material in order that the lid 34 and the body portion 27 act as extensions of the electrode layers 38 and 39 to provide solid and reliable electrical connections therewith.

Because all known useful polymer pyroelectric materials also have piezoelectric properties that cause the development of electrostatic charges on their surfaces due to bending or compression thereof, the medium 36 is stretched tightly between the lid 34 and the body portion 27 to aid in preventing it from bending. Also, it is highly preferable to have an insulative layer 40, such as a rigid, low thermal conductive material, on the back of the exposed portion of the medsium 36 to reduce bending thereof. The layer 40 must be in surface-to-surface contact with the medium 36 by means of adhesive or in some other fashion. Even better, the medium 36 may be foamed in place between the body portion 27 and the lid 34 by application of a low thermal conductive liquid polymeric foam that cures to a hardened rigid condition. The advantage of foaming in place is that the foam adheres to the medium 36 without the need of glues or other adhesive agents.

Fixed to the periphery of the body portion open end 29 to form part of the inner housing 12 is a second rim type lid 41 to which is attached a circuit board 42. A sensing circuit 43 is mounted on the board 42 and is electrically connected across the layers 37 and 38 through connections with the lid 34 and body portion 27, respectively, for detecting development of electrostatic charges on the surfaces of the medium 36 and providing an indication of such charge developments as described in U.S. copending application, Ser. No. 543,035 filed Jan. 22, 1975, and incorporated herein by reference. The support members 26 are disposed through the board 42 for the dual purposes of fastening the board 42 to end 24 of the outer housing 11 and also as electrical terminals for making connections to the circuitry 43. The support members 26 are highly rigid to serve as sturdy supports for holding the inner housing 12 in a fixed position within the outer housing 11 so that substantially no mechanical vibration of the housing 11 will be transmitted to the housing 12.

There has thus been described a preferred embodiment of a pyroelectric thermal sensing device that is substantially immune from noise due to bending or compression of the sensing medium employed therein. By the use of the two housing constructions described, the inner housing 12 is substantially isolated from the outer housing 11 to prevent the transmission of mechanical vibrations therebetween. Also, since the outer housing 11 is hermetically sealed, convection currents are prevented from reaching the inner housing 12. To eliminate airborne acoustic oscillations from acting on the sensing medium a rigid pane 20 may seal off the front end of the housing 11. Furthermore, the entire sensing medium contained in the inner housing 12 may be reinforced by a rigid foam backing 40 to inhibit bending of the sensing medium and thereby improve the signal to noise ratio of the sensing signal.

What is claimed is:

1. A pyroelectric infra-red radiation sensing device exhibiting an improved signal to noise ratio comprising:
   outer housing means sealed to preclude entry of noise creating currents,
   infra-red radiation transmissive window means in said outer housing means,
   a pyroelectric sensing medium disposed within said outer housing means in facing relationship to said window means to directly receive infra-red radiation transmitted through said window means, said pyroelectric sensing medium having a surface area exposed to said window means of at least one square centimeter and comprising a pyroelectric film and conductive electrode means on opposing surfaces of said pyroelectric film,
   said window means being sufficiently rigidly constructed to inhibit airborne acoustic oscillations from acting on said sensing medium,
   inner housing means for holding said sensing medium in a stretched configuration within said outer housing means,
   support means for supporting said inner housing means in a relationship to said outer housing means to inhibit transmission of mechanical vibration from said outer housing means to said sensing medium, and backing means of a low thermally conductive member in contact with the conductive electrode of said sensing medium on the side away from said window.

2. The device of claim 1 wherein said backing means is formed in situ.

3. The device of claim 1 wherein said backing means is a rigid foam.

4. The device of claim 1 further comprising a circuit board providing a base for said inner housing means, and said support means comprises post members extending from said outer housing means to said circuit board whereby said inner housing is held in spaced relationship from the inner walls of said outer housing means by said post members.

5. The device of claim 1 wherein said outer housing means is electrically conductive.

6. The device of claim 1 wherein said inner housing means comprises first and second electrically conductive portions and said pyroelectric sensing medium is held between said first and second electrically conductive portion.

7. The device of claim 6 wherein said first electrically conductive means of said inner housing means comprises: a body portion with at least one open end having an inner flange; and said second electrically conductive means of said inner housing means comprises a rim shaped lid portion having an inner flange the periphery of which defines an open center, which lid portion is formed to slidably fit over the open end of said body portion so that said inner flanges of said body portion and said lid portion are juxtaposed with one another to grip said pyroelectric film therebetween.

* * * * *